Feb. 27, 1940.  C. H. LOW  2,191,937
LIGHT SHIELD
Filed Dec. 27, 1938
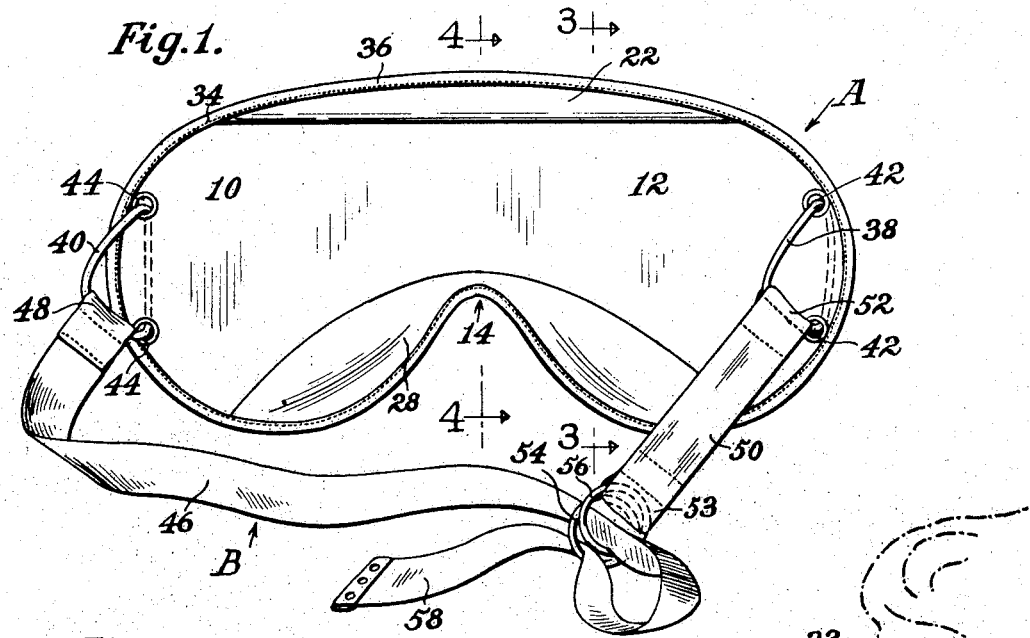
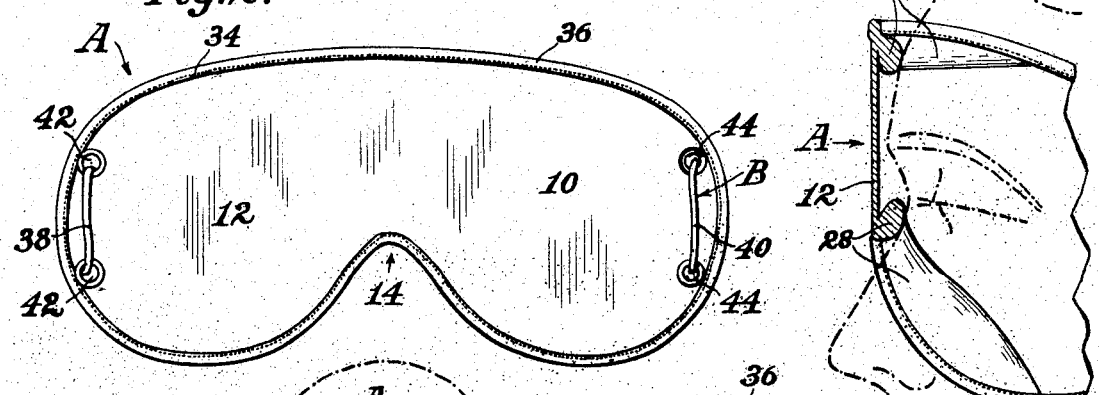
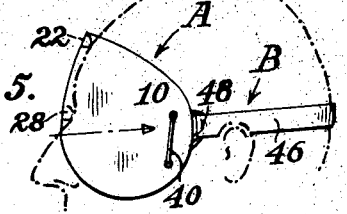
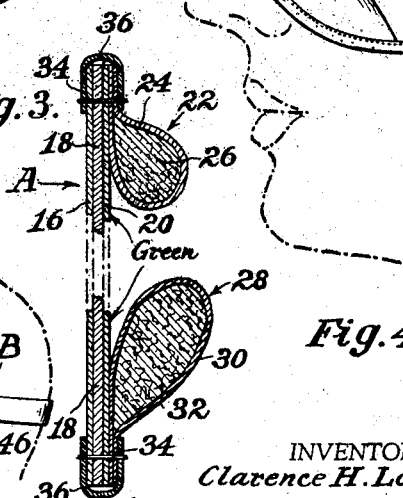
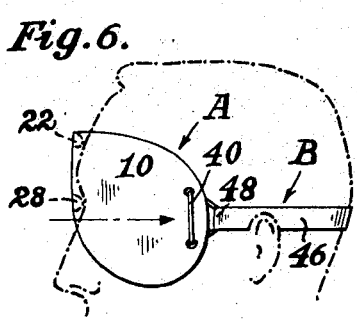
INVENTOR.
Clarence H. Low.
ATTORNEY.

Patented Feb. 27, 1940

2,191,937

UNITED STATES PATENT OFFICE 2,191,937

LIGHT SHIELD

Clarence H. Low, New York, N. Y., assignor to Flents Products Co. Inc., New York, N. Y., a corporation of New York Application December 27, 1938, Serial No. 247,894

4 Claims. (Cl. 2—17)

This invention relates generally to light shields and particularly to light shields intended to exclude light from the eyes.

It is a common experience for the average person to find that he is unable to sleep when he tries to do so in a room that is light, either due to natural or artificial conditions. For example, daylight may be flooding the room, or an occupant of the room wishing to have light, may have lighted a lamp while another occupant is trying to sleep.

In order to permit of sleep under such conditions the idea of covering the eyes suggests itself, and devices of that type have been heretofore used. However, such devices as have come to my attention are not entirely satisfactory. They may for example fail to exclude light from the eyes sufficiently, or they may be uncomfortable to wear, as where parts thereof exert disagreeable pressure or interfere with the movements of the eyelashes or other movable parts, or again, while they may be suitable for wear by particular persons, they may be unsuitable for wear by others, because of differences in the shape, size and relative location of the parts of the head of different persons for which no adjustability or compensation is provided in the eyeshade.

Among the objects of my invention is therefore the provision of a light shield that will be effective to exclude light from the eyes, that will be comfortable to the wearer and will fit heads and faces of varied contours.

Among the more particular objects of my invention is the provision of a light shield in which sufficient space is provided to accommodate the eyelashes of a wearer and to permit free movement thereof, the provision in a light shield of means for holding the same in place that is readily adjusted for any particular wearer, and also the provision in a light shield of an inner lining that is soothing and restful.

It is the general object of my invention to provide a light shield that is simple, effective and low in manufacturing and maintenance costs.

These objects and such other objects as will hereinafter appear or be pointed out are attained in the illustrative embodiment of my invention shown in the drawing, in which:

Figure 1 is an elevational view of an improved light shield constructed according to the principle of my invention, as viewed from the rear or inside;

Figure 2 is an elevational view of the light shield of Figure 1 as viewed from the front or outside, with the attaching bands omitted;

Figure 3 is a fragmentary sectional view on an enlarged scale and taken substantially on the line 3—3 of Figure 1, looking in the direction of the arrows;

Figure 4 is a sectional view of a portion of the light shield of Figure 1, taken on the line 4—4 thereof, looking in the direction of the arrows, and showing the same in position over the eyes; and Figures 5, 6 and 7 are, respectively, diagrammatic views intended to illustrate the capacity of my light shield for adjusting itself to heads of various shapes.

Referring now to the drawing in detail it will be observed that the illustrative embodiment shown therein comprises a main body portion designated generally by A, and attaching means designated generally by B.

The body portion A is shown as comprising two lateral lobes 10 and 12 united to each other and each adapted to cover one of the eyes of the wearer and so contoured that a space 14 is provided between them for the nose of a wearer. When the enlarged cross-section shown in Figure 3 is viewed, it will be noted that the body portion A is shown as comprising an interior layer 18, an outer lining 16 and an inner lining 20. The layer 18 forms the foundation and is preferably made of flexible material having sufficient body and rigidity to normally maintain the shield in flattened form. The outer lining 16 may be of any suitable or preferred material that will give the light shield a pleasing appearance, such as fabric, and the same is true of the lining 20. The latter is preferably green in color, so that even if light accidentally succeeds in entering beneath the eye shade, its effect will, owing to the green color, of the lining, be a soothing one, because of the well known psychological characteristics of the color green. In actual practice I have found black silk for the outer lining 16, and green silk for the inner lining 20 to be very satisfactory.

A pad 22, comprising an outer lining 24 and a filling 26, which is preferably soft and yielding, is provided along the upper edges of the body portion A and is adapted to overlie the forehead as shown in Figure 4. A second pad 28 comprising an outer lining 30 and a filling 32 is provided along the lower edge of the body portion; its mid portion overlies the bridge of the wearer's nose while its distal portions overlie the cheeks (see Figure 3), and it will be observed that the mid portion is of restricted cross-sectional area, while the distal portions are relatively full.

The linings 16 and 20, the interior layer 18, and the linings 24 and 30 of the pads 22 and 28 are conveniently secured together by stitching 34 passing through the lining tape 36 surrounding the entire body portion A, and doubled over the edge thereof so as to form a hem including the edge portions of the linings 24 and 30.

The attaching means B is shown as comprising a pair of flexible loops 38 and 40 passing respectively each through a pair of spaced openings 42 and 44. A band or tape 46 is provided at one end with a looped portion 48 through which passes the loop 40, so that the portion 48 is free to slide laterally on the loop 40. A second band or tape 50 is provided at one end with a looped portion 52 through which passes the loop 38, and at its other end with a looped portion 53 through which pass a pair of rigid endless members, such as the rings 54 and 56.

When the free end 58 of the band 46 is inserted first through both rings 54 and 56, and then between them, as shown in Figure 1, an adjustable juncture is provided between the bands 46 and 50, whereby tension tending to pull them apart will be resisted by the juncture, which will hold them more tightly the greater is the tension. Consequently when the light shade is placed on the head and the tapes are properly adjusted by pulling on the end 58 of tape 46, the tapes and the light shade will stay put. Loosening of the tapes 46 and 50 may be effected by pulling on the tapes 46 and 50 so as to relax the tension on their juncture.

The loops 38 and 40 are preferably made elastic, whereby a tension will be constantly present when the light shade is adjusted on the head, which tends to prevent loosening of the tapes 46 and 50. Due to the spacing of the openings constituting each pair of openings 42 and 44, it will be noted that the looped portions 52 and 48 of bands 46 and 50 are free to slide laterally, and thereby the points at which the bands exert their pull on the shade can be changed. As will be explained hereinafter, this feature is of great importance and utility for purposes of adjusting the shield to desired positions.

The light shield is worn as indicated in Figures 4 to 8 inclusive by covering the eyes with the light shade so that its lobes 10 and 12 each cover one of the eyes and the nose projects into the space 14, while the pad 28 rests on the bridge of the nose, and the pad 22 rests on the forehead (see Figure 4). The bands 46 and 50 are conveniently passed over the ears, as shown in Figures 5, 6 and 7, as thereby the bands 46 and 47 will tend to remain in place. The body portion A may then be shifted until it assumes a comfortable position in which it performs its desired function most effectively.

As clearly appears from Figures 5, 6 and 7 the bands 46 and 50 may shift laterally as well as angularly in relation to the body portion A, so that they will exert a pull in the direction and at a point requisite to holding the body portion A in the desired position. This is made possible by the capacity for lateral shifting of the looped portions 48 and 52 at points closely adjacent to the body portion A, this capacity depending on the shortness of the loops 38 and 40, and the spacing of the openings 42 and 44 through which they pass.

It will be obvious that the capacity for lateral shifting of the ends of the adjusting means may be obtained by constructions other than those disclosed. For example instead of using loops 38 and 40 slidably connected to the body portion, such loops, or sections thereof might be permanently secured to the body portion in such a manner that the ends of the bands might slide laterally thereon.

Obviously also it is not necessary that the supporting means be in the form of two bands; a single band might be substituted therefor provided sufficient elasticity is provided either in the band or in the connecting loops 38 and 40 or their equivalents. Further in the construction shown, instead of making the loops 38 and 40 elastic, these loops might be made rigid and the bands elastic. Other constructions for effecting the objects pointed out will also suggest themselves to those skilled in the art.

As will be apparent from Figure 4, the pads, besides being instrumental in shutting out light that would otherwise enter from above and from below, also effect a spacing of the light shield body A from the face, with the result that the eyelashes may move freely within the space so obtained.

While I have herein disclosed one illustrative embodiment of my invention it will be understood that my invention may be embodied in many other forms without departing from the spirit thereof, as will be obvious to those skilled in the art, and that the disclosure herein is by way of illustration merely, and is not to be interpreted in a limiting sense, and that I do not limit myself other than as called for by the prior art.

Having thus described my invention and illustrated its use, what I claim as new and desire to secure by Letters Patent, is:

1. A light shield comprising a light excluding portion adapted to overlie the eyes of a wearer, and means for supporting said portion on the head, said means comprising a flexible elongated member provided with means for adjustably varying its length, short resilient loops slidably carried by said portion, and a slidable connection between said loops and the ends of said member, said loops being so short that said ends are always maintained in relatively close adjacency to said portions.

2. In a light shield, a member adapted to overlie the eyes of the wearer and to exclude light, said member carrying thereon a light excluding pad adapted to lie across the forehead of a wearer, and a second light excluding pad adapted to engage the nose and the cheeks of a wearer, means for supporting said member on the head, said means comprising a pair of vertically aligned spaced openings adjacent each end of said member, a resilient loop passing slidably through each pair of said openings, a flexible band having each of its end portions mounted for vertical sliding movement on one of said loops, the length of said loops being such that the ends of said band are held in relatively close adjacency to said light excluding member while being free to slide vertically on said loops, and said flexible band comprising two sections adjustably connected together, whereby the length of the band may be varied.

3. In an eyeshield a body portion comprising an interior layer and linings, a pad positioned adjacent the upper edge of said body portion, a pad positioned adjacent the lower edge of said body portion, each of said pads comprising a doubled over outer lining portion surrounding a filling, a tape doubled over the outer rim of said body portion and including said interior layer, said linings and the free edges of said pad linings, and a seam securing together said interior layer, said linings and said pad linings.

4. A light shield comprising a light excluding portion adapted to overlie the eyes of a wearer, and means for supporting said portion on the head, said means comprising a flexible elongated member consisting of two parts with means adjustably uniting said two parts, short resilient loops slidably carried by said portion, and a slidable connection between said loops and the ends of said member, said loops being so short that said ends are always maintained in relatively close adjacency to said portions.

CLARENCE H. LOW.